Nov. 28, 1967 | K. G. KING, SR | 3,355,177

RECORD CLEANING DEVICE

Filed Jan. 7, 1965

INVENTOR.
KARL G. KING Sr.
BY
Salvatore G. Militana
attorney

United States Patent Office 3,355,177

Patented Nov. 28, 1967

3,355,177
RECORD CLEANING DEVICE
Karl G. King, Sr., 1921 NW. 79th St., Miami, Fla. 33126
Filed Jan. 7, 1965, Ser. No. 423,927
4 Claims. (Cl. 274—47)

ABSTRACT OF THE DISCLOSURE

The present invention consists of an elongated flat body member having a spindle contacting slot at one end and alternatively a spindle adapter having a peg attachable to the slotted end of the body member to act as a pivot on the record when it is not on the turntable and an arcuate portion along the other end to form a liquid receiving trough, openings in the trough for wetting a pad mounted on the outer surface of the trough and a handle mounted in the trough and extending upwardly for swinging the record cleaning device.

This invention relates to cleaning devices and is more particularly directed to a record cleaning device.

A principal object of the present invention is to provide a versatile record cleaner that may be used to clean a record automatically and simultaneously as it is being played, or as it rests on a turntable prior to or after being played or while the record is away from the turntable.

Another object of the present invention is to provide a record cleaner with a shallow trough which receives a cleaning fluid and distributes it evenly to a fabric pad or cleaning member which cleans the record.

A further object of the present invention is to provide a record cleaning device which is simple in construction, inexpensive in cost and most versatile in its use in the cleaning of records.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
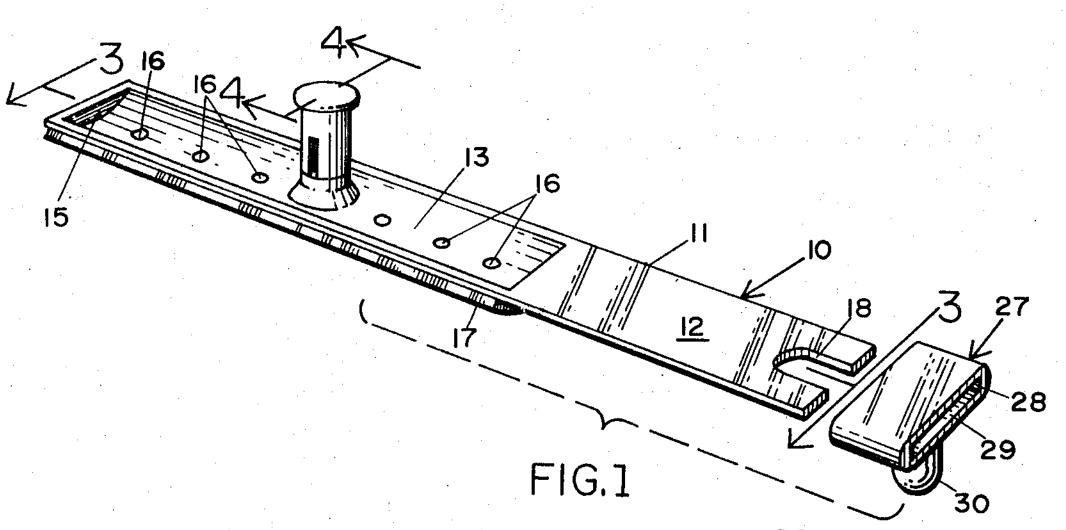
FIGURE 1 is a perspective view of a record cleaning device embodying my invention.

Referring to the drawing wherein like numerals are used to designate similar parts throughout the several views the numeral 10 refers to my record cleaning device consisting of an elongated body member 11 that is flat at one end as at 12 and arcuate as at 13 along the remainder of the body member 11. The arcuate portion 13 is provided with end walls 14 and 15 to form a trough for containing a cleaning fluid and with a plurality of openings 16 to permit the cleaning fluid to percolate therethrough and onto a fabric member or pad 17 which is cemented or otherwise fastened to the outside or lower surface of the trough 13.

Figure 3:
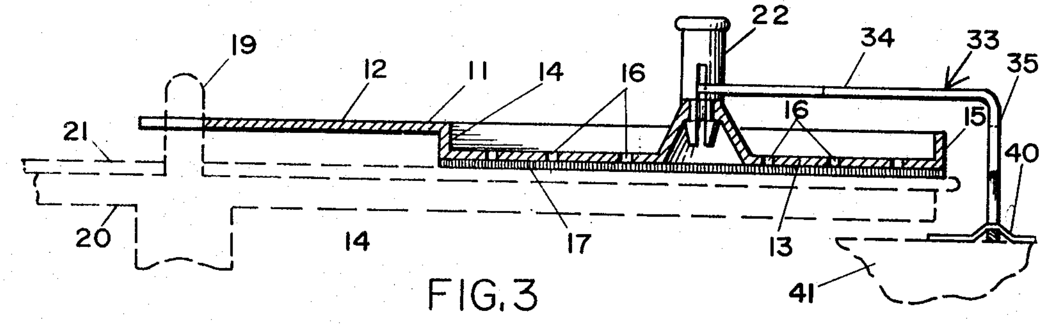
FIGURE 3 is a sectional view taken along the line 3—3 of FIGURE 1 showing my device in cleaning position as a record is being played on a turntable.

At the other end of the flat body portion 12 of my record cleaning device 10 is a slot 18, whose function is to receive the spindle 19 of a turntable 20 when the cleaning device 10 is being used to clean a record 21 which is resting in position on a turntable as shown by FIGURE 3 and explained in detail hereinafter.

Mounted within the trough 13 and extending upwardly is a handle 22 consisting of a hollow cone shaped base member 23 which is cast or molded integrally with the trough 13 and provided with an inwardly directed shoulder 26. A cylindrical handle member 24 which is provided with a radially disposed slot 37 extending to the lower edge thereof and with a peripheral slot 25 is fitted in the base member 23 and retained therein by the slot 25 receiving the shoulder 26 of the base member 23. At the top of the handle member 24 in an enlarged head portion 27 for easy manipulation of the cleaning device 10.

The flat body portion 12 is provided with a sleeve 27 consisting of a pair of spaced upper and lower walls 28 and 29 joined at their edges as best shown by FIGURE 1 with a pin 30 extending from the mid portion of the walls 28 and 29 to a position beyond the wall 29. The sleeve 27 is used along with the cleaning device 10 when it is desired to clean a record 31 which is not being played, the pin 30 being received by the opening 32 is record 31.

In order that my cleaning device 10 can be used to clean the record 21 simultaneously with the playing of the record 21 on the turntable 20, an anchor device 33 is provided. The anchor device 33 consists of an L-shaped flat body portion having leg portions 34 and 35 positioned at right angle to each other. The free end of the leg portion 34 is slotted as at 36 with inwardly extending finger portions 38 mounted thereon and received by the radially disposed slot 37 of the handle member 24. The leg portion 34 is of sufficient length to permit the leg portion 35 to extend beyond the edge of the turntable 20 when the finger portions 38 are positioned in the slot 37. The leg portion 35 is provided with a large opening 39 in order that a fastening member 40 such as scotch tape, a weight or a magnet may extend therethrough and secure the lower edge 41 of the leg portion 35 to a stationary part 41 of the record player adjacent to the turntable 20.

As can be readily noted from the above discussion of my record cleaning device 10 taken in connection with the drawing, the cleaning device 10 is sufficiently versatile to permit cleaning a record while the record is being played, while resting on the turntable or when removed from the turntable.

Figures 2, 4, 5:
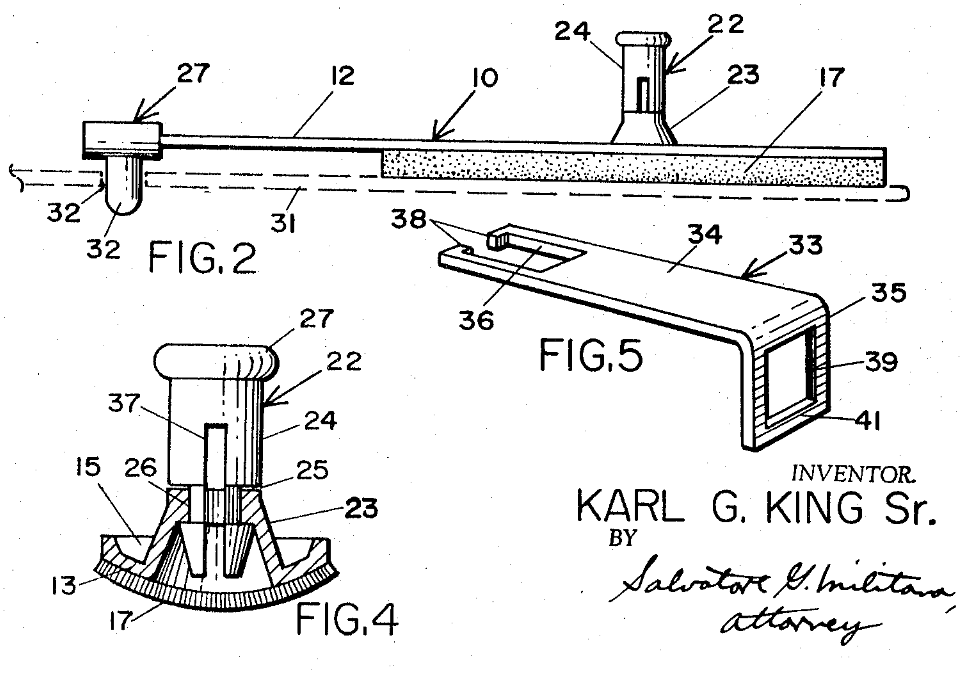
FIGURE 2 is a side elevational view of a record being cleaned by my device.
FIGURE 4 is a sectional view taken along the line 4—4 of FIGURE 1.
FIGURE 5 is a perspective view taken along the line 4—4 of FIGURE 1.

To clean the record 31 while holding the latter in one's hand for example, the sleeve member 27 which is telescopically mounted on the free end of the flat body portion 12 is placed at the mid portion of the record 31. The pin 30 is inserted into the opening of 32 of the record 31 and the fabric pad 17 engages the upper surface of the record 31 as shown by FIGURE 2. The pad 17 which has been saturated with a certain quantity of cleaning fluid that had been poured in the trough 13 and had seeped through the opening 16 will now engage and sweep over the grooved area of the record as a person grasps the handle 22 and swings the elongated body portion 11 in a circle about the pin 30.

If it is desired to clean the record 21 positioned on the turntable 20 which is stationary then the sleeve 27 is withdrawn from the free end of the flat body portion 12 to uncover the slot 18. The record cleaning device 10 is then placed radially on the record 21 with the slot 18 fitted over the spindle 19 of the turntable 20. The person using the record cleaning device 10 now grasps the handle 22 and swings the device 10 about the record 21 to clean the record.

Now if it is desired to clean the record 21 as it is being played on the turntable 20, the anchoring device 33 is mounted on the handle 22 by gently spreading the finger portions 38 apart to permit the latter to slide along the sides of the handle member 24 and snap into the slot 37 of the handle member 24. The leg portion 35 of the anchoring device 33 will now rest on a stationary part 41 of the record player. A fastening member 40 such as Scotch tape is then placed through the opening and made to adhere to the upper surface of the record player 41. See FIGURE 3. This prevents the movement of the record cleaning device 10 as the turntable 20 and the record 21 are rotating. The fabric pad 17 saturated with a cleaning fluid will brush along the grooved surface of the record 21 to maintain the latter clean. When the cleaning fluid placed on the device 10 has been consumed, it is readily replenished by pouring a desired amount in the trough 10 to seep slowly through the openings 16 and saturate the fabric pad 17 and assist the latter in cleaning the record.

Having disclosed my invention, what I claim as new and desire to secure by Letters Patent of the United States is:

1. A record cleaning device comprising a flat body portion having a slot at one end, an arcuate portion extending in from the other end of said body portion along the length thereof and disposed such that the arcuate portion forms a cross-section which is perpendicular to the length thereof, end walls mounted on said arcuate portion forming a liquid receiving trough, a plurality of openings in said arcuate portion, pad means mounted on the outer surface of said trough whereby liquid placed on said trough will pass through said openings and wet said pad means and a handle mounted in said trough and extending upwardly for swinging said record cleaning device.

2. A record cleaning device comprising a flat body portion having a slot at one end, an arcuate portion extending in from the other end of said body portion along the length thereof and disposed such that the arcuate portion forms a cross-section which is perpendicular to the length thereof, end walls mounted on said arcuate portion forming a liquid receiving trough, a plurality of openings in said arcuate portion, pad means mounted on the outer surface of said trough whereby liquid placed on said trough will pass through said openings and wet said pad means, a handle mounted in said trough and extending upwardly for swinging said record cleaning device, sleeve means slidably positioned on said one end of said flat body portion and pivot pin means mounted on said sleeve means.

3. A record cleaning device comprising a flat body portion having a slot at one end, an arcuate portion extending in from the other end of said body portion along the length thereof and disposed such that the arcuate portion forms a cross-section which is perpendicular to the length thereof, end walls mounted on said arcuate portion forming a liquid receiving trough, a plurality of openings in said arcuate portion, pad means mounted on the outer surface of said trough whereby liquid placed on said trough will pass through said openings and wet said pad means, a handle mounted in said trough and extending upwardly for swinging said record cleaning device, said handle having a slotted portion, an anchoring member extending beyond said one end of said flat body portion, means releasably securing one end of said anchoring member to said slotted portion and fastening means for securing said other end of said anchoring member to a stationary body.

4. A record cleaning device comprising a flat body portion having a slot at one end to receive a spindle of a turntable, an arcuate portion extending in from the other end of said body portion along the length thereof and disposed such that the arcuate portion forms a cross section which is perpendicular to the length thereof, end walls mounted on said arcuate portion forming a trough, pad means mounted on the outer surface of said trough to form an arcuate cleaning surface and rotatable handle means mounted in said trough and extending upwardly for swinging said record cleaning device with said slot engaging a spindle of said turntable and said arcuate pad means in contact relation with said record on said turntable.

References Cited

UNITED STATES PATENTS

| | | | |
|---|---|---|---|
| 1,318,145 | 10/1919 | Harbaugh | 274—47 |
| 1,423,523 | 7/1922 | Grow | 274—47 |
| 2,977,127 | 3/1961 | Mertes | 274—47 |

LEONARD FORMAN, *Primary Examiner.*

F. J. D'AMBROSIO, *Assistant Examiner.*